United States Patent [19]

Iwatsuki et al.

[11] Patent Number: 5,065,319

[45] Date of Patent: Nov. 12, 1991

[54] POWER CONTROL SYSTEM FOR VEHICLES

[75] Inventors: Kunihiro Iwatsuki, Toyota; Shinichiro Tanaka, Mishima, both of Japan

[73] Assignee: Toyota Jidosha Kabushiki Kaisha, Toyota, Japan

[21] Appl. No.: 622,795

[22] Filed: Dec. 5, 1990

[30] Foreign Application Priority Data

Dec. 12, 1989 [JP] Japan .................. 1-322400

[51] Int. Cl.[5] .................. B60K 41/06; G06F 15/50
[52] U.S. Cl. .................. 364/424.1; 364/431.03
[58] Field of Search .................. 364/424.1, 431.03; 74/866

[56] References Cited

U.S. PATENT DOCUMENTS 4,809,660 3/1989 Marsh et al. .................. 364/431.03
4,815,340 3/1989 Iwatsuki et al. .................. 364/424.1

OTHER PUBLICATIONS

890529, Chrysler Motors Corp., pp. 45–53, M. B. Leising, et al., "The All-Adaptive Controls for the Chrysler Ultradrive Tranaxle".

870081, GMC, pp. 27–34, S. A. Haider, et al., "Powertrain Torque Management".

Primary Examiner—Salvatore Cangialosi
Attorney, Agent, or Firm—Oblon, Spivak, McClelland, Maier & Neustadt

[57] ABSTRACT

A power control system for use with an engine which is connected through a torque converter to a transmission includes a speed ratio calculating device for determining the speed ratio of the torque converter, a torque ratio calculating device for determining the torque ratio of the torque converter from the speed ratio, a capacity factor calculating device for determining the capacity factor of the torque converter on the basis of the speed ratio, an input torque calculating device for determining an input torque to the transmission by making use of the torque ratio and the capacity factor, a detection device for detecting an overtorque state by comparing the torque to be applied to the component of the transmission mechanism or a drive mechanism in accordance with the input torque with an allowable torque predetermined for the component, and an output device for outputting a signal to engine torque control device to drop the output torque of the engine in case the overtorque state is detected.

11 Claims, 6 Drawing Sheets

FIG.3

| P.N | C1 | C2 | C0 | B0 | B1 | B2 | B3 | Auxiliary Transmission Assembly | Main Transmission Assembly |
|---|---|---|---|---|---|---|---|---|---|
| R | | ○ | ○ | | | | ○ | LOW | RW |
| 1 | ○ | | ○ | | | | × | LOW | 1ST SPEED |
| 2 | ○ | | | ○ | | | × | HIGH | 1ST SPEED |
| 3 | ○ | | | | × | ○ | | LOW | 2ND SPEED |
| 4 | ○ | | ○ | ○ | × | ○ | | HIGH | 2ND SPEED |
| 5 | ○ | ○ | | | | ○ | | LOW | 3RD SPEED |
| 6 | ○ | ○ | | ○ | | ○ | | HIGH | 3RD SPEED |

{ B } { A }

POWER CONTROL SYSTEM FOR VEHICLES

BACKGROUND OF THE INVENTION

The present invention relates to a power control system for a vehicle, which is equipped with a torque converter and enabled to control the engine torque independently of an accelerator pedal.

At the time of an engine stall under a high load when the brake pedal and the accelerator pedal are simultaneously depressed, generally speaking the load to be applied to the drive train is considerably higher than that to be applied for the ordinary start and acceleration. This requires a stronger—and so heavier—drive train. It has been conceived to lessen the weight of the drive train including the automatic transmission by reducing the engine torque automatically under such circumstances, to lighten the load upon the drive train.

This concept is exemplified by SAE Paper 870081 disclosing the technology which is directed to an engine control system for an automobile using an automatic transmission. According to this technology, the weight of the automatic transmission can be lessened by lightening the load to be applied to the automatic transmission. Specifically, the engine torque is determined at first from the flow rate of intake air of the engine and is then multiplied by the torque ratio of the torque converter to calculate the input torque of the transmission. Thus, the engine torque is reduced by controlling the ignition timing such that the input torque of the transmission does not exceed an allowed maximum value of the transmission.

Since, however, the flow rate of intake air of the engine and the engine torque are not proportional in a transient state wherein the flow rate of intake air is abruptly varied, an error is naturally caused by the method of determining the engine torque from the flow rate of intake air. More specifically, the flow rate of intake air of the engine is generally measured by means of an air flow meter. The flow rate of intake air is increased as soon as the accelerator pedal is depressed at a certain or higher rate. Even if this increase is detected, the rise of the engine torque is considerably delayed from the detection, because the intake air has to pass through a portion having a large capacity such as a surge tank interposed between the air flow meter and the engine.

Since, in this transient state, the rise of the engine torque is considerably delayed from the increase in the intake air flow rate, the calculation of the engine torque on the basis of the flow rate results in a large error.

In the above-specified method of the prior art, moreover, the inertia of the rotary components of the engine and/or the torque converter is not especially considered for calculating the input torque to be applied to the automatic transmission. The inertial torque of those rotary components also augments the error at the rising time of the speed of revolution of the engine. Thus, there arises another problem that excess input torque of the automatic transmission is calculated, the excess corresponding to the error augmentation. In case the engine output is increased to raise the number of revolutions, the torque increase is partially consumed by the change of the number of revolutions of the rotary components so that the input torque to the automatic transmission is accordingly decreased. In the prior art, however, the inertial torque of the rotary components is not taken into account for the calculation. The value of the input torque obtained thus higher than the actual value, thus raising a further problem that an unnecessary control is executed to drop the torque.

SUMMARY OF THE INVENTION

An object of the present invention is to prevent an engine torque from being reduced more than necessary, by accurately determining either an input torque to be inputted to a power train including a transmission or a torque to be applied to the components of the power train.

Another object of the present invention is to determine either the input torque to be inputted to the power train or the torque to be applied to the components of the power train, accurately from the rotary state of a torque converter.

A further object of the present invention is to provide a power control system for optimizing a control for reducing the engine torque, by determining the input torque to the power train accurately on the basis of the speed ratio, torque ratio and capacity factor of the torque converter.

According to the present invention, there is provided a power control system which comprises:

speed ratio calculating means for determining the speed ratio of a torque converter;

torque ratio calculating means for determining the torque ratio of the torque converter on the basis of said speed ratio;

capacity factor calculating means for determining the capacity factor of the torque converter on the basis of said speed ratio;

input torque calculating means for determining an input torque to a transmission by using said torque ratio and said capacity factor;

detection means for detecting an overtorque state by comparing the torque to be applied to said transmission and the components of a drive mechanism in accordance with the input torque with an allowable torque predetermined for said components; and output means for outputting a signal to an engine torque control means, in case said overtorque state is detected, to reduce the output torque of said engine.

In the power control system of the present invention, the speed ratio of the torque converter can be determined on the basis of the speeds of revolution of the engine and the turbine runner.

In the power control system of the present invention, the torque to be applied to the components of a power train is determined on the basis of the gear ratio set in the transmission and the input torque to the transmission, and the overtorque state is detected from the determined torque and the predetermined allowable torque so that the engine torque may be reduced when the overtorque state is established.

According to the present invention, there is also provided a power control method which comprises:

a step of determining the speed ratio of a torque converter;

a step of determining the torque ratio and the capacity factor of the torque converter from said speed ratio;

a step of determining the input torque to the transmission, which is connected to the engine through the torque converter, by using the torque ratio and the capacity factor;

a step of detecting the overtorque state by comparing the torque to be applied to the transmission or the components of the drive mechanism connected to the former in accordance with the input torque with an allowable torque predetermined for the components; and a step of outputting a signal to the engine torque control means so that the output torque of the engine may be dropped in case the overtorque state is detected.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a clutch and brake application chart;

DETAILED DESCRIPTION OF THE PREFERRED EMBODIMENTS

Figure 1:
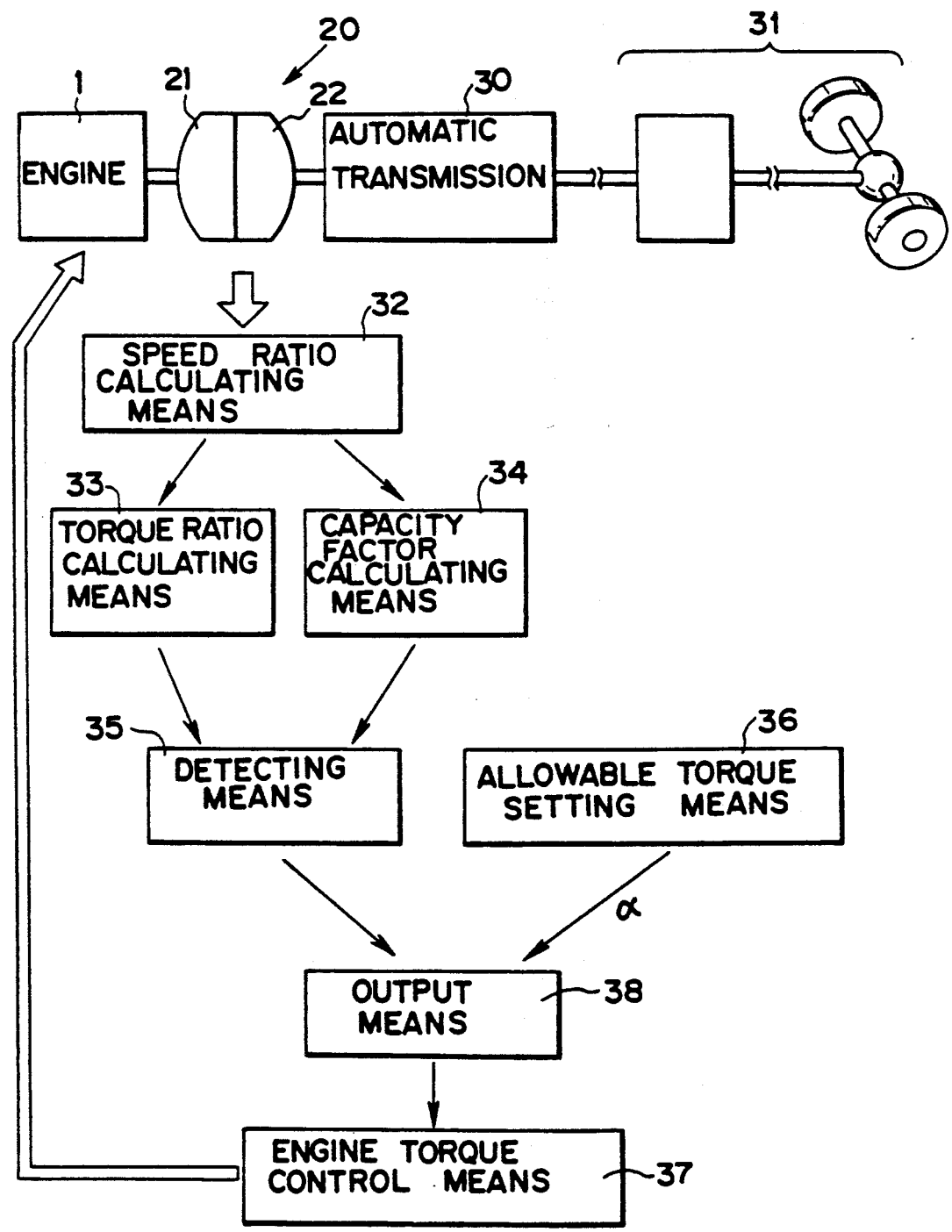
FIG. 1 is a block diagram showing the fundamental structure of a power control system according to the present invention.

First of all, the fundamental structure of the power control system of the present invention will be described with reference to FIG. 1.

An engine 1 is enabled to have its output torque changed by changing the ignition timing, for example. To this engine 1, there is connected a torque converter 20 having a pump impeller 21 and a turbine runner 22. To this torque converter 20, there are connected an automatic transmission 30 and a drive mechanism 31 in the recited order.

There is provided speed ratio calculating means 32 for determining the speed ratio e of the torque converter 20. This speed ratio e is the ratio between the speed of revolution Np of the pump impeller 21 and the speed of revolution Nt of the turbine runner 22. Hence, the speed ratio calculating means 32 calculates the speed ratio e from the individual speeds of revolution Np and Nt which are obtained from suitable speed sensors (although not shown). Incidentally, the speed of revolution Np of the pump impeller 21 is equal to the output speed of revolution Ne of the engine 1. On the other hand, the speed of revolution Nt of the turbine runner 22 can be determined from the vehicle speed and the gear ratio set in the automatic transmission 30.

Figure 5:
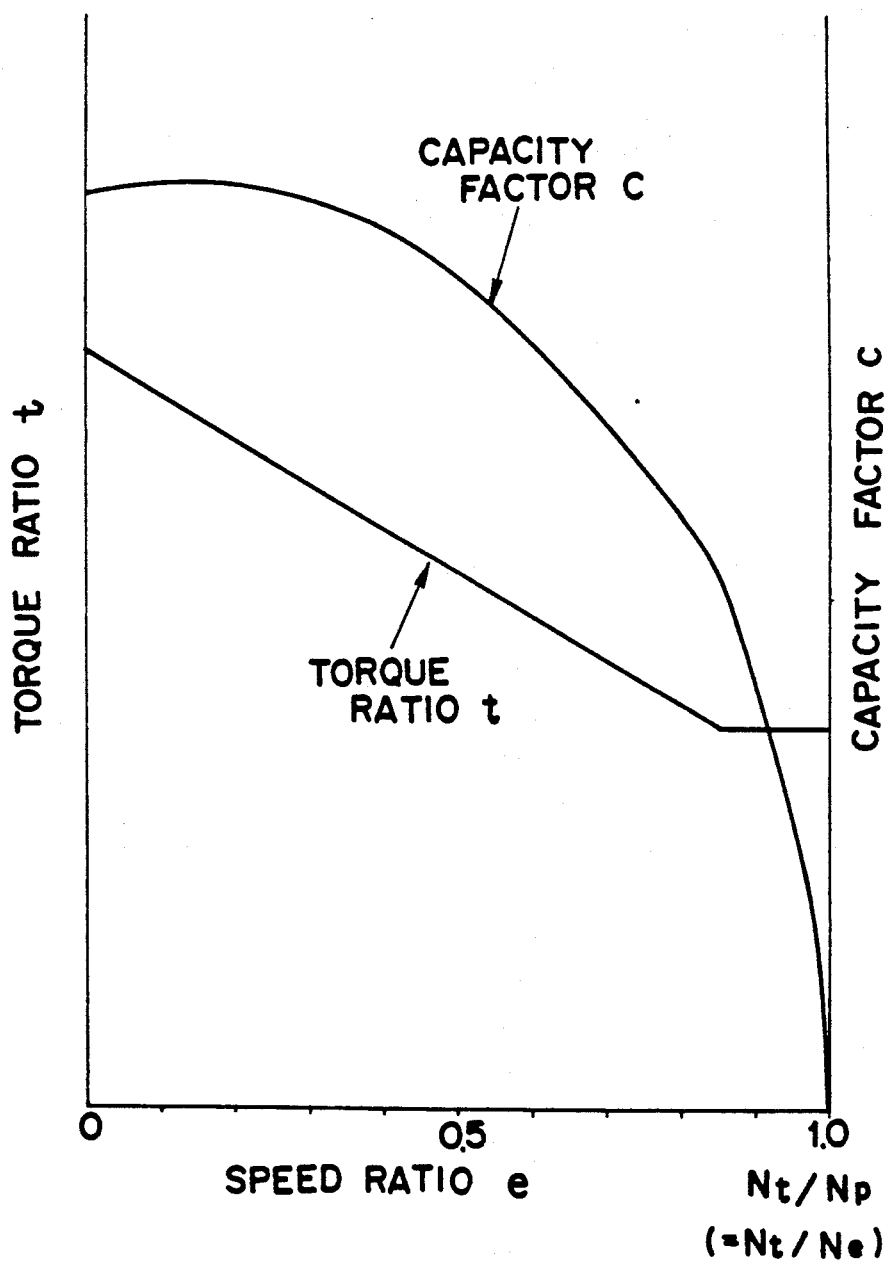
FIG. 5 is a diagram plotting the relations between the speed ratio of the torque converter of the automatic transmission and the torque ratio and the capacity factor.

There are also provided torque ratio calculating means 33 for determining the torque ratio t from the speed ratio e and capacity factor calculating means 34 for determining the capacity factor C from the speed ratio e. The individual torque ratio t and capacity factor C and the speed ratio e are expressed by the functional relations, as shown in the diagram of FIG. 5. Therefore, the torque ratio t and the capacity factor C corresponding to the speed ratio e inputted can be outputted by determining the values of the torque ratio t and the capacity factor C in a manner to correspond to the individual speed ratios e and by either storing them as a map in advance or storing their approximate formulas. Here, the capacity factor C is an coefficient determined by the various factors such as the diameter of the torque converter 20 and is expressed as a function of the speed ratio e.

There is further provided input torque calculating means for determining an input torque Tt to be inputted to the automatic transmission 30. This input torque Tt is determined by the following formula. Specifically, the torque Tp of the pump impeller 21 in the torque converter 20 is determined from the speed of revolution Ne of the engine 1 (i.e., the speed of revolution Np of the pump impeller 21) and the capacity factor C by the following formula (1):

$$Tp = C \times Ne^2 \qquad (1).$$

On the other hand, the torque Tt of the turbine runner 22 is inputted as it is to the automatic transmission 30 so that it is determined by the following formula (2) on the basis of the torque Tp of the pump impeller 21 and the torque ratio t:

$$Tt = t \times Tp \qquad (2).$$

There is further provided detection means 35 for detecting an overtorque state. This detection means 35 compares an allowable torque α set by allowable torque setting means 36 with the aforementioned input torque Tt and judges if there is an overtorque condition. If this allowable torque α is within the allowable range of the automatic transmission 30, the aforementioned input torque Tt is compared as it is with the allowable torque α. If, on the other hand, the allowable torque α is within the allowable range of any component of the automatic transmission 30 and the drive mechanism 31, the torque determined by the aforementioned input torque Tt and the gear ratio set in the automatic transmission 30 is compared with the allowable torque.

There is further provided output means 38 for outputting a signal to the engine torque setting means 37 so that the output torque of the engine 1 may be reduced, if the aforementioned detection means 35 outputs the signal in response to the overtorque state. The engine torque control means 37 drops the output torque by changing the ignition timing in the engine 1, for example, and can be constructed mainly of an engine control computer. The output means 38 continuously outputs the signal to drop the output torque of the engine 1 until the overtorque state disappears.

In the system thus constructed, therefore, the torque inputted to the automatic transmission 30 can be directly determined on the basis of the revolving state of the torque converter 20 to determine the input torque accurately. Moreover, the overtorque is not erroneously misjudged to prevent the engine torque from being reduced even if unnecessary.

A more specific embodiment will be described in the following.

Figure 2:
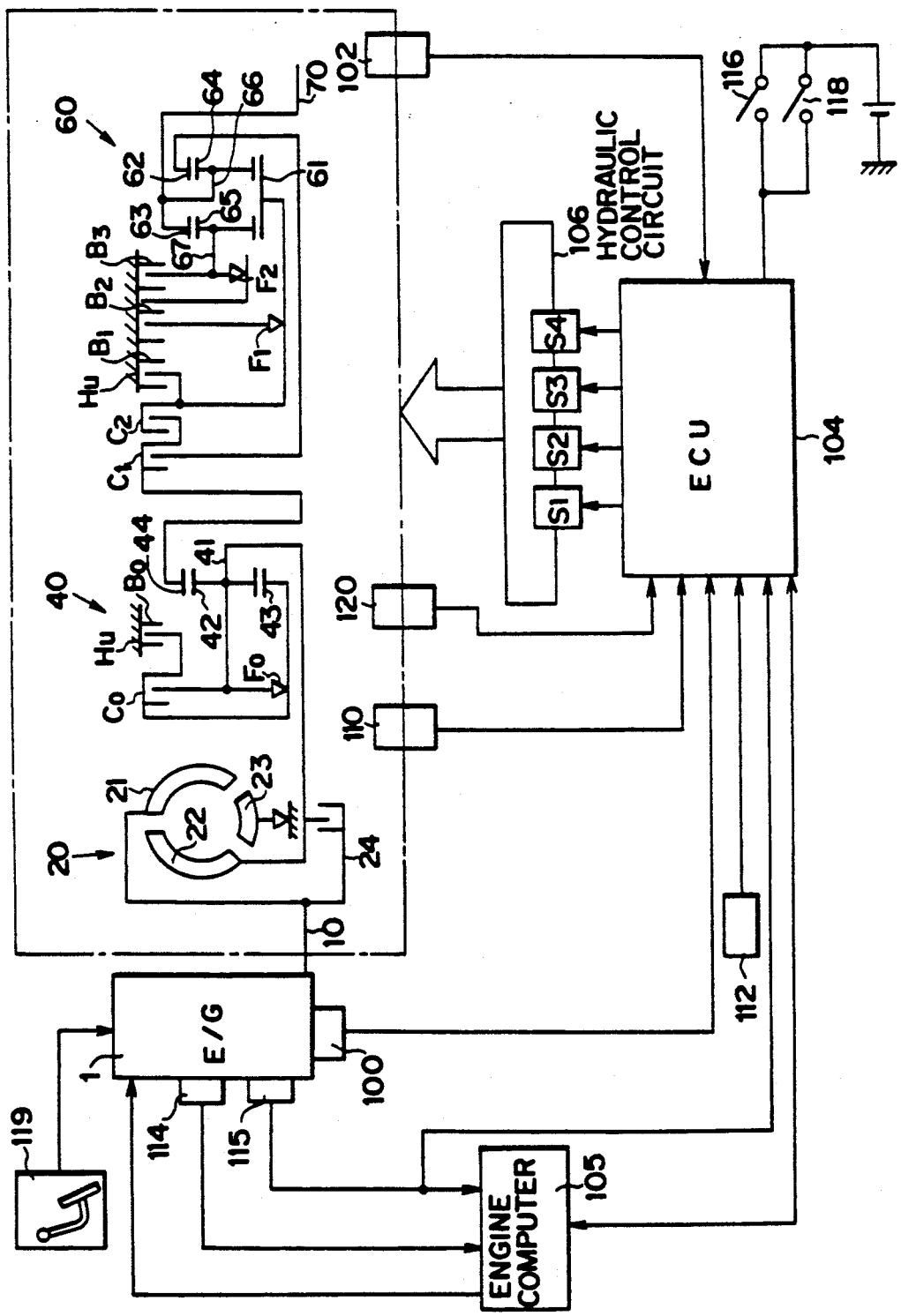
FIG. 2 is a overall schematic diagram showing a power train connected through a torque converter to an engine and a control system thereof.

In FIG. 2, the automatic transmission is connected through the torque converter 20 to the engine 1 and is equipped with an auxiliary transmission assembly 40 for switching two high and low gears and a main transmission assembly 60 for effecting three forward and one reverse gear stages.

The aforementioned torque converter 20 is equipped with the pump impeller 21, the turbine runner 22, a stator 23 and a lockup clutch 24. The pump impeller 21 is connected to the crankshaft 10 of the engine 1, and the turbine runner 22 is connected to the carrier 41 of the planetary gear set in the auxiliary transmission assembly 40.

In this auxiliary transmission assembly 40, a planetary pinion 42 is rotatably supported by the carrier 41 and meshes with a sun gear 43 and a ring gear 44. On the other hand, a clutch $C_o$ and a one-way clutch $F_o$ are interposed between the sun gear 43 and the carrier 41, and a brake $B_o$ is interposed between the sun gear 43 and a housing Hu.

The aforementioned main transmission assembly 60 is equipped two front and rear planetary gear sets. These planetary gear sets are composed of a shared sun gear 61, ring gears 62 and 63, planetary pinions 64 and 65, and carriers 66 and 67.

The ring gear 44 of the auxiliary transmission assembly 40 is connected through a clutch $C_1$ to the aforementioned ring gear 62. Another clutch $C_2$ is interposed between the aforementioned ring gear 44 and sun gear 61. Moreover, the aforementioned carrier 66 is connected to the aforementioned ring gear 63, and these carrier 66 and ring gear 63 are connected to an output shaft 70. On the other hand, a brake $B_3$ and a one-way clutch $F_2$ are interposed between the aforementioned carrier 67 and housing Hu. A brake $B_2$ is interposed through a one-way clutch $F_1$ between the sun gear 61 and the housing Hu. A brake $B_1$ is also interposed between the sun gear 61 and the housing Hu.

In the automatic transmission thus constructed, an electronic control unit (ECU) 104 is made receptive of the signals of: a throttle sensor 100 for detecting the throttle opening reflecting the load state of the engine 1; and a vehicle speed sensor 102 for detecting the vehicle speed. Thus, the shift control of the automatic transmission is carried out by driving/controlling solenoid valves $S_1$ to $S_4$ in a hydraulic control circuit 106 in accordance with preset shift patterns by the electronic control unit 104 so that the engagements of the individual clutches and brakes are combined, as enumerated in column B of FIG. 3, to effect the shift control.

Incidentally, in FIG. 3, symbols ○ indicate the engaged states, and symbols X indicate that the engaged states are taken only when the engine braking is used.

The solenoid valves $S_1$ and $S_2$ effect the shift control of the main transmission assembly 60, and the solenoid $S_3$ effects the high and low gear controls of the auxiliary transmission assembly 40. Moreover, the solenoid valve $S_4$ effects the control of the lockup clutch 24 of the torque converter 20.

Incidentally, reference numeral 110 appearing in FIG. 2 designates a shift position sensor for detecting the positions N, D, R and so on to be selected by the driver. Numeral 112 designates a pattern select switch for selecting an E (i.e., economic run) pattern, a P (i.e., power run) pattern and so on. Numeral 116 designates a foot brake switch, and numeral 118 designates a brake switch for detecting the action of a side brake switch. Numeral 119 designates an accelerator pedal.

In the present embodiment, the aforementioned electronic control unit 104 is made receptive of not only the above-specified input signals but also the signal of a speed sensor 120 for detecting the speed of revolution of the turbine of the torque converter and the signal of a speed sensor 115 for detecting the speed of revolution of the engine.

Incidentally, reference numeral 105 appearing in FIG. 2 designates an engine computer for increasing or decreasing the engine torque in accordance with the torque control requiring signal coming from the aforementioned electronic control unit 104. Numeral 114 designates a water temperature sensor for detecting the temperature of the engine cooling water.

Figure 4:
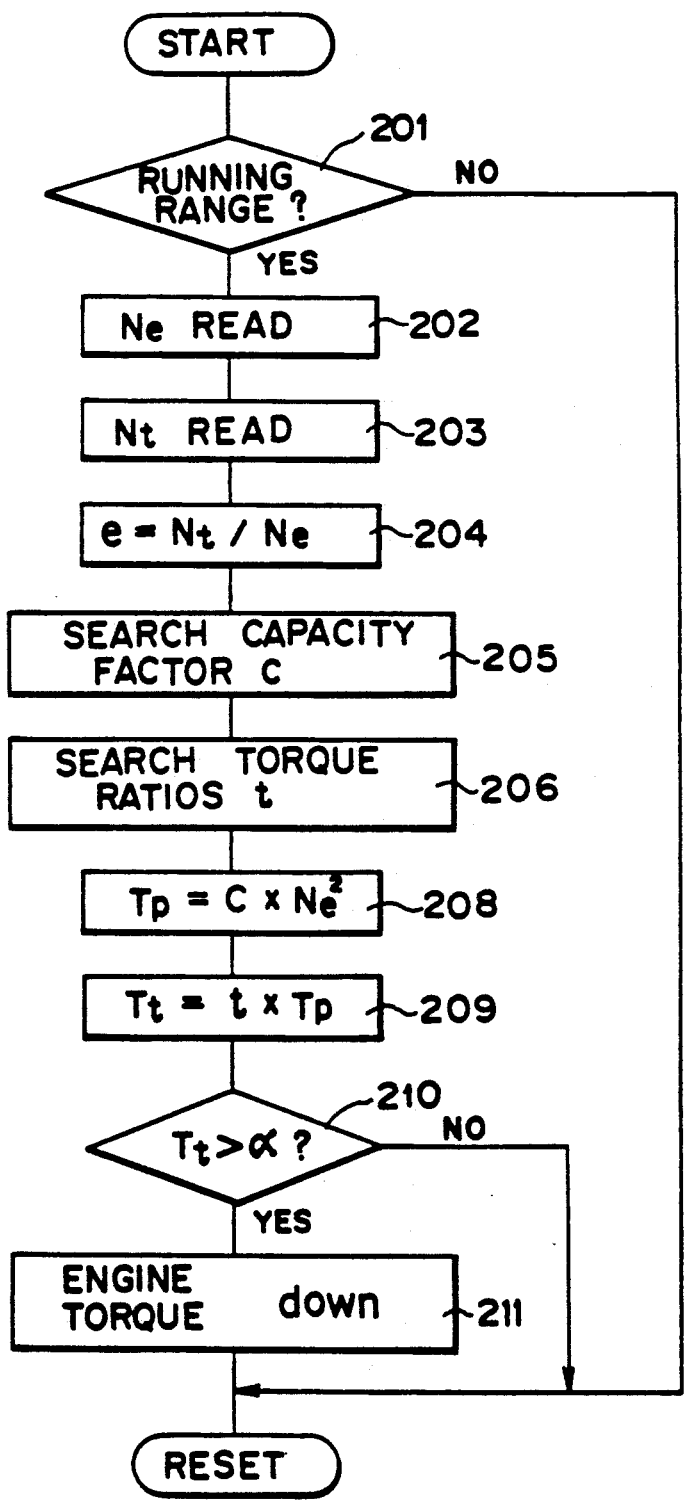
FIG. 4 is a flow chart for explaining the control method.

FIG. 4 is a flow chart showing a control routine to be executed in the electronic control unit 104. In the present embodiment, the mechanism of the drive train to be protected is the automatic transmission.

The control routine will be described stepwise in the following.

At first Step 201, it is decided by the shift position sensor 110 whether the shifting operation conducted by the drive is the run range (i.e., one of D, L, 2 and R ranges) or the stop range (i.e., either of P and N ranges). The routine advances to Step 202, if in the run range, but to Reset if in the stop range. In other words, the present control is executed only when the shift range is the run range.

At Steps 202 and 203, the speed of revolution Ne of the engine 1 is monitored by the speed sensor 115, and the speed of revolution Nt of the turbine runner 22 of the torque converter is monitored by the speed sensor 120.

Next, at Step 204, the speed ratio e (=Nt/Np=Nt/Ne) of the turbine runner 22 and the pump impeller 21 in the torque converter 20 is calculated. Since the speed of revolution Np of the pump impeller 21 of the torque converter 20 is equal to that of the engine 1, the speed ratio e of the torque converter is determined by the calculation of the ratio of Nt/Ne.

Next, at Step 205, the capacity factor C is determined by using that functional map of the speed ratio e of the torque converter 20 and the capacity factor C, which is stored in the electronic control unit 104, as is presented in FIG. 5.

Next, at Step 206, the torque ratio t of the torque converter 20 is likewise determined by using that functional map of the speed ratio e and the torque ratio t of the torque converter 20, which is stored in advance in the electronic control unit 104, as is also presented in FIG. 5.

At Step 208, the torque Tp of the pump impeller 21 of the torque converter 20 is determined by the following formula from both the capacity factor C determined at Step 205 and the speed of revolution Ne of the engine 1, which is read at Step 202:

$$Tp = C \times Ne^2 \qquad (3).$$

Next, at Step 209, the torque Tt of the turbine runner 22 of the torque converter 20 is determined by the following formula from both the torque ratio t of the torque converter 20 determined at Step 206 and the torque Tp of the pump impeller 21 of the torque converter 20, which is determined at Step 208:

$$Tt = t \times Tp \qquad (4).$$

Here, the torque Tt of the turbine runner 22 of the torque converter 20 is the input torque to the automatic transmission.

At Step 210, the allowable overtorque is decided by comparing the torque of the turbine runner 22 thus determined, i.e., the input torque Tt to the automatic transmission with that allowable torque $\alpha$ of the automatic transmission, which is set in advance in the electronic control unit 104. The routine advances to Step 211 if the input torque Tt to the automatic transmission is higher than the allowable torque $\alpha$, and otherwise to Reset. In other words, the torque reducing control at Step 211 is not executed unless in the overtorque state. At Step 211, the engine torque is reduced until the input torque Tt to the automatic transmission becomes equal to the allowable torque $\alpha$, thus protecting the automatic transmission.

Incidentally, the control for reducing the engine torque is executed by changing the ignition timing in accordance with the output signal coming from the engine computer 105.

Figure 6:
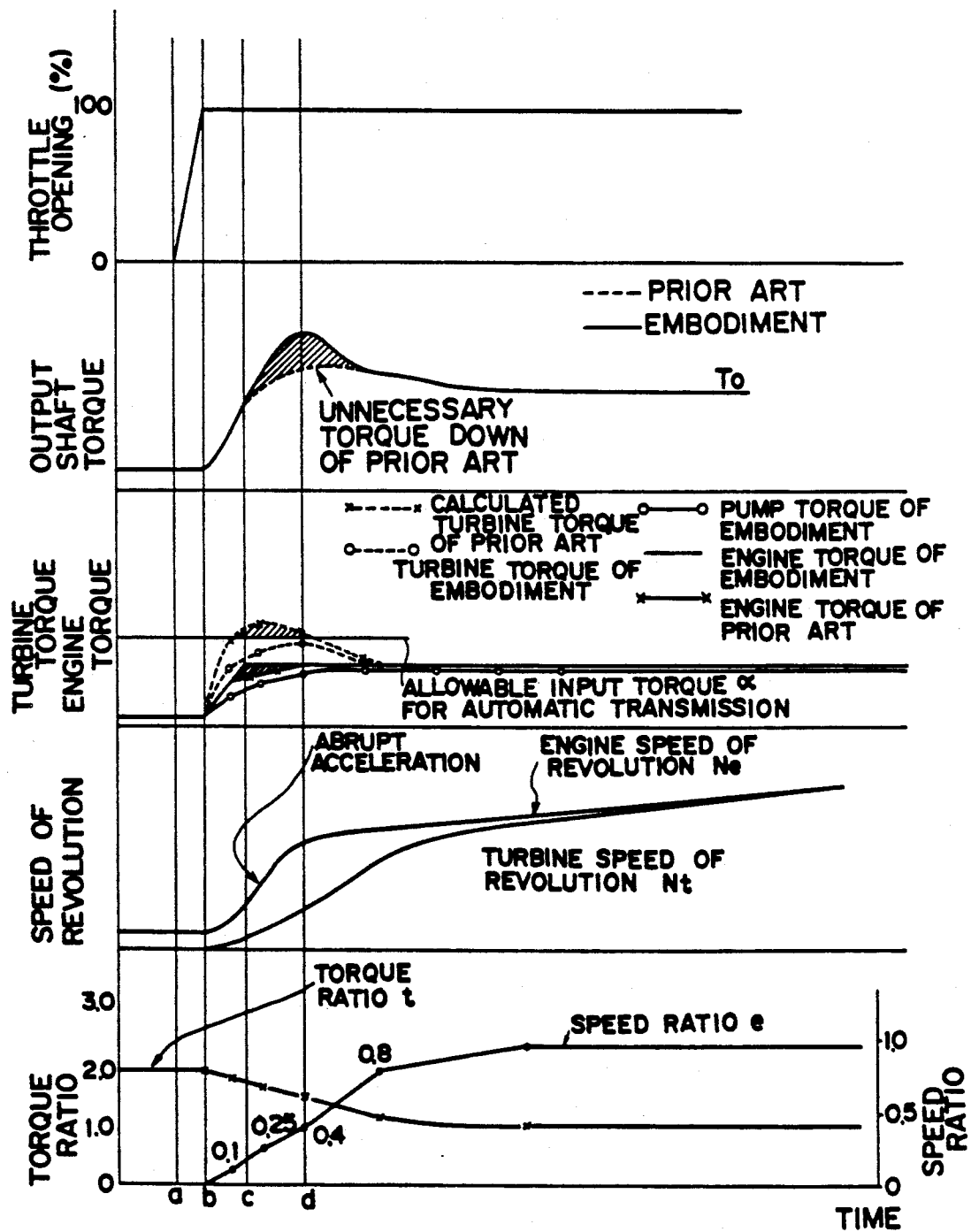
FIG. 6 is a diagram plotting the start and acceleration characteristics of the control system of the engine.

FIG. 6 illustrates the effects of the present embodiment. Specifically, FIG. 6 presents the start and acceleration characteristics when the accelerator pedal is depressed from the idle stall state to its full stroke.

If the accelerator is depressed at point a to its full stroke, the engine torque is raised from point b due to response delay until it reaches full output at point c (as indicated by a solid curve appearing at the middle of FIG. 6). As the engine torque increases, the engine speed of revolution Ne is abruptly accelerated in the vicinity of point c. In accordance with this, the vehicle is also accelerated together with the turbine speed of revolution Nt.

Since the pump torque is made lower, by the influence of the engine inertia, than the engine torque, as has been described hereinbefore, it is gradually increased, as shown by a solid curve having circles at data points in FIG. 6. The turbine torque Tt of the torque converter follows a broken curve because it is defined by multiplying the pump torque Tp by the torque ratio t which is specified by the speed ratio e at each time. Moreover, the multiplication of the turbine torque Tt by the gear ratio of the automatic transmission substantially gives the output shaft torque $T_o$ of the automatic transmission. Strictly speaking, this output shaft torque $T_o$ of the automatic transmission should be lessened by the inertia torque in the automatic transmission concerned.

Here, since the aforementioned turbine torque Tt, i.e., the input torque of the automatic transmission will not exceed the allowable input torque level, the engine torque need not be reduced to reduce the input torque Tt of the automatic transmission.

In the system of the prior art, however, the engine torque is estimated to determine the turbine torque, as has been described hereinbefore. As a result, the estimation of the engine torque itself is not accurate because the rise of the engine torque in response to the increase in the flow rate of intake air is delayed. In addition, no consideration is taken of the reduction of the torque due to the influences of the engine inertia so that the turbine torque Tt determined by the calculation is higher than the actual one (as indicated by a dotted line having data points marked by crosses). Incidentally, this tendency is left unchanged even if not the flow rate of intake air but the throttle opening or the intake vacuum is used to determine the engine torque.

The value thus calculated exceeds (as hatched in the vicinity of points c to d) the allowable input level of the automatic transmission (i.e., its level $\alpha$ located at the middle of FIG. 6, as could be apparently seen from FIG. 6). In the control system of the prior art, it is misunderstood that the input torque to the automatic transmission might exceed the allowable value although it does not, so that the control is executed to reduce the engine torque, as indicated by a solid curve having data points marked by crosses. As a result, an unnecessary torque-down is caused, too, in the output shaft torque $T_o$ of the automatic transmission, as hatched in FIG. 6.

When the input torque of the automatic transmission to be protected is to be determined, the system of the present embodiment adopts not the method of determining the input torque on the basis of the engine torque but the method of determining the same on the basis of the several coefficients (e.g., the torque ratio t or the capacity factor C) of the torque converter. As a result, it is possible to prevent the power performance from being dropped by executing the unnecessary torque-down control.

Incidentally, in case the components to be protected are other than those of the automatic transmission (i.e., the components downstream of the automatic transmission) such as the propeller shaft or the differential gear, the engine torque may be controlled by deciding the allowable overtorque of those components to be protected, which are interposed between the input portion of the components and the input portion of the automatic transmission, by considering the inertia of the components, the gear ratio or the like.

As has been described hereinbefore, according to the present invention, there can be attained the excellent effect that the load upon, and the weight of, the components of the automatic transmission and the downstream drive train can be lightened without dropping the startability and acceleration of the vehicle. This effect is ensured by reducing the engine torque, only when the true input torque of the components to be protected under a driving condition or near the engine stall under a high load exceeds the allowable input torque but without causing the disadvantage such as the unnecessary torque-down while the engine speed of revolution is rising as at the start and acceleration time.

What is claimed is:

1. In a vehicle comprising an engine, a torque converter connected to the engine and having a pump impeller and a turbine runner, a transmission connected to said torque converter, a drive mechanism connected to said transmission, and engine torque control means for controlling the output torque of said engine independently of an accelerator pedal, a power control system for controlling the output torque said engine, said power control system comprising:

speed ratio calculating means for determining the speed ratio of said torque converter;

torque ratio calculating means for determining the torque ratio of said torque converter from said speed ratio;

capacity factor calculating means for determining the capacity factor of said torque converter on the basis of said speed ratio;

input torque calculating means for determining an input torque to said transmission by making use of said torque ratio and said capacity factor;

detection means for detecting an overtorque state by comparing the input torque determined by said input torque calculating means with an allowable torque predetermined for one of said transmission and said drive mechanism; and output means for outputting a signal to said engine torque control means to drop the output torque of said engine when the overtorque state is detected.

2. A power control system according to claim 1, further comprising:

a first sensor for detecting the speed of revolution of said engine; and a second sensor for detecting the speed of rotation of said turbine runner, wherein said speed ratio calculating means comprises means for determining said speed ratio on the basis of the output signal of said first sensor and the output signal of said second sensor.

3. A power control system according to claim 1, further comprising:

a vehicle speed sensor for detecting the vehicle speed; and a first sensor for detecting the speed of revolution of said pump impeller, wherein said speed ratio calculating means comprises means for determining both the speed of revolution of said turbine runner on the basis of the gear ratio set by said transmission and the vehicle speed and said speed ratio on the basis of the speed of revolution of said turbine runner and the speed of revolution of said pump impeller detected by said first sensor.

4. A power control system according to claim 1, wherein said torque ratio calculating means and said capacity factor calculating means comprise means for outputting a torque ratio and a capacity factor according to the speed ratio inputted, and means for storing values of the torque ratio, and said capacity factor, as a function of said speed ratio.

5. A power control system according to claim 1, wherein said torque ratio calculating means and said capacity factor calculating means comprise means for storing a function determining the relation between said speed ratio and said torque ratio and a function determining the relation between said speed ratio and said capacity factor and means for determining said torque ratio and said capacity factor on the basis of the speed ratio inputted and said functions.

6. A power control system according to claim 1, wherein said detection means comprises means for determining the torque to be applied to said component on the basis of the gear ratio set in said transmission and said input torque.

7. A power control method of controlling the output torque of an engine by engine torque control means dependently of an accelerator pedal, comprising:

a step of determining the speed ratio of a torque converter;

a step of determining the torque ratio and capacity function of said torque converter from said speed ratio;

a step of determining an input torque to a transmission connected to said engine through said torque converter, by making use of said torque ratio and capacity factor;

a step of detecting an overtorque state by comparing a torque to be applied to a component of said transmission or a drive mechanism connected thereto in accordance with the input torque with an allowable torque preset for said component; and a step of outputting a signal to said engine torque control means to drop the output torque of said engine when said overtorque state is detected.

8. A power control method according to claim 7, wherein said speed ratio is determined on the basis of the speed of revolution of said engine and the speed of revolution of a turbine runner.

9. A power control method according to claim 7, wherein the speed of revolution of a turbine runner is determined on the basis of the gear ratio set in said transmission and the vehicle speed, and wherein said speed ratio is determined on the basis of the speed of rotation of said turbine runner and the speed of revolution of a pump impeller obtained by a first sensor.

10. A power control method according to claim 7, wherein said torque ratio and said capacity factor are determined on the basis of a function determining the relation between said speed ratio and said torque ratio and a function determining the relation between said speed ratio and said capacity factor.

11. A power control method according to claim 7, wherein the torque to be applied to said component is determined on the basis of a gear ratio set in said transmission and said input torque.

* * * * *

UNITED STATES PATENT AND TRADEMARK OFFICE
CERTIFICATE OF CORRECTION

PATENT NO.  : 5,065,319
DATED       : 11/12/91
INVENTOR(S) : KUNIHIRO IWATSUKI ET AL.

It is certified that error appears in the above-identified patent and that said Letters Patent is hereby corrected as shown below:

Column 8, line 54, after "torque" insert --of--.

Column 10, line 8, change "dependently" to --independently--;

line 16, after "and" insert --said--.

Signed and Sealed this

Eighteenth Day of May, 1993

Attest:

MICHAEL K. KIRK

Attesting Officer        Acting Commissioner of Patents and Trademarks